United States Patent
Lee et al.

(10) Patent No.: US 10,345,018 B2
(45) Date of Patent: Jul. 9, 2019

(54) EJECTOR AND REFRIGERATION CYCLE APPARATUS HAVING EJECTOR

(71) Applicant: LG ELECTRONICS INC., Seoul (KR)

(72) Inventors: Kangwook Lee, Seoul (KR); Dongkeun Yang, Seoul (KR); Choonjae Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 224 days.

(21) Appl. No.: 15/447,585

(22) Filed: Mar. 2, 2017

(65) Prior Publication Data
US 2018/0120004 A1    May 3, 2018

(30) Foreign Application Priority Data
Oct. 27, 2016    (KR) .......................... 10-2016-0141233

(51) Int. Cl.
*F04F 5/00*    (2006.01)
*F04F 5/44*    (2006.01)
(Continued)

(52) U.S. Cl.
CPC ................ *F25B 41/00* (2013.01); *F25B 9/08* (2013.01); *B60H 2001/3298* (2013.01); (Continued)

(58) Field of Classification Search
CPC .................. F25B 41/00; F25B 2341/00; F25B 2341/001; F25B 2341/0011; (Continued)

(56) References Cited

U.S. PATENT DOCUMENTS 6,779,360 B2    8/2004    Kawamura et al.
6,966,199 B2    11/2005   Takeuchi
(Continued)

FOREIGN PATENT DOCUMENTS

JP    3310042    7/2002
JP    3327934    9/2002
(Continued)

OTHER PUBLICATIONS

European Search Report dated Feb. 12, 2018.

*Primary Examiner* — Cassey D Bauer
*Assistant Examiner* — Miguel A Diaz
(74) *Attorney, Agent, or Firm* — Ked & Associates LLP

(57) ABSTRACT

An ejector and a refrigeration cycle apparatus having an ejector are provided. The ejector may include an ejector body having an accommodation space therein, a suction portion through which a high pressure refrigerant and a low pressure refrigerant may be suctioned into the accommodation space, and a mixing portion configured to mix the high pressure refrigerant with the low pressure refrigerant; a nozzle provided in the ejector body, having a nozzle neck and an expansion portion, and configured to inject the high pressure refrigerant into the mixing portion; a first needle moveably provided at the expansion portion, and configured to control a flow sectional area of the expansion portion; a second needle moveably provided at the nozzle neck, and configured to control a flow sectional area of the nozzle neck; a first needle drive configured to drive the first needle; and a second needle drive configured to drive the second needle. With such a configuration, the flow sectional area of the nozzle neck and the flow sectional area of the expansion portion may be independently controlled in correspondence to a drive condition.

19 Claims, 11 Drawing Sheets

(51) Int. Cl.
*F04F 5/46* (2006.01)
*F25B 9/08* (2006.01)
*F25B 41/00* (2006.01)
*F25B 1/06* (2006.01)
*B60H 1/32* (2006.01)

(52) U.S. Cl.
CPC . *F04F 5/00* (2013.01); *F04F 5/44* (2013.01); *F04F 5/46* (2013.01); *F04F 5/461* (2013.01); *F04F 5/463* (2013.01); *F05D 2260/601* (2013.01); *F25B 2341/00* (2013.01); *F25B 2341/001* (2013.01); *F25B 2341/0012* (2013.01); *F25B 2341/0013* (2013.01); *F25B 2400/23* (2013.01); *F25B 2600/02* (2013.01)

(58) Field of Classification Search
CPC ...... F25B 2341/0012; F25B 2341/0013; F25B 2341/0014; F25B 2400/23; F25B 2600/02; F25B 9/08; F04B 23/04; F04F 5/00; F04F 5/54; F04F 5/44; F04F 5/46; F04F 5/461; F04F 5/463; F05D 2260/601; B60H 2001/3298
See application file for complete search history.

(56) References Cited

U.S. PATENT DOCUMENTS

| | | | |
|---|---|---|---|
| 7,823,400 B2* | 11/2010 | Oshitani | F25B 41/00 62/191 |
| 9,285,146 B2* | 3/2016 | Liu | F04F 5/461 |
| 9,696,069 B2* | 7/2017 | Liu | F04F 5/461 |
| 2004/0089019 A1 | 5/2004 | Kawamura et al. | |
| 2004/0172966 A1* | 9/2004 | Ozaki | F04F 5/04 62/500 |
| 2005/0155374 A1 | 7/2005 | Oshitani et al. | |
| 2005/0188719 A1* | 9/2005 | Sugiura | B41J 2/17596 62/500 |
| 2010/0209818 A1* | 8/2010 | Fukuma | F04F 5/20 429/513 |
| 2013/0277448 A1* | 10/2013 | Liu | F04F 5/461 239/11 |
| 2014/0346250 A1* | 11/2014 | Magi | F04F 5/461 239/310 |
| 2015/0260435 A1* | 9/2015 | Kawano | F25B 1/06 62/238.7 |
| 2016/0054033 A1* | 2/2016 | Matsuura | F25B 1/10 62/498 |
| 2016/0195316 A1* | 7/2016 | Liu | F04F 5/461 239/417.5 |
| 2017/0248350 A1* | 8/2017 | Liu | F25B 13/00 |
| 2017/0356683 A1* | 12/2017 | Park | F25B 41/00 |
| 2018/0073523 A1* | 3/2018 | Brunner | F04F 5/20 |
| 2018/0274821 A1* | 9/2018 | Lee | F25B 1/06 |

FOREIGN PATENT DOCUMENTS

| | | | | |
|---|---|---|---|---|
| JP | 2005282507 A | * | 10/2005 | ............ F04F 5/04 |
| JP | 3941602 | | 7/2007 | |
| JP | 2009144609 A | * | 7/2009 | |
| JP | 4367168 | | 9/2009 | |
| JP | 4599782 | | 12/2010 | |
| WO | WO 2012/092685 | | 7/2012 | |

* cited by examiner

EJECTOR AND REFRIGERATION CYCLE APPARATUS HAVING EJECTOR

CROSS-REFERENCE TO RELATED APPLICATION(S)

Pursuant to 35 U.S.C. § 119(a), this application claims the benefit of an earlier filing date of and the right of priority to Korean Application No. 10-2016-0014233, filed in Korea on Oct. 27, 2016, the contents of which are incorporated by reference herein in its entirety.

BACKGROUND

1. Field

An ejector and a refrigeration cycle apparatus having an ejector are disclosed herein.

2. Background

As is well known, a refrigeration cycle apparatus includes a compressor configured to compress a refrigerant, a high pressure side heat exchanger configured to cool the compressed refrigerant, an expansion device configured to depressurize and expand the refrigerant, and an evaporator configured to evaporate the refrigerant as the refrigerant absorbs latent heat. An ejector connected to each of a high pressure side heat exchanger and the evaporator is provided at a part of the refrigeration cycle apparatus.

The ejector used in the refrigeration cycle apparatus is configured to prevent loss occurring during an expansion process by expanding a high pressure refrigerant (main flow), and to reduce power consumption of the apparatus by increasing a pressure of a low pressure refrigerant (suction flow) discharged from an outlet of the evaporator. However, the conventional ejector and the refrigeration cycle apparatus having the same may have the following problems.

As a flow amount of a refrigerant passing through a nozzle is proportional to a sectional area (diameter, inner diameter) of a neck of the nozzle (a discharge side end), the sectional area (diameter, inner diameter) of the neck of the nozzle should be controlled in a sophisticated manner. More specifically, as the diameter of the neck of the nozzle requires precise dimension control so as to have a tolerance of several tens of microns (μm), it is not easy to process and fabricate the nozzle.

Second, even if a flow sectional area of the nozzle is formed through precise dimension control, if a pressure condition, such as a change in thermal load, is changed, an expansion deficiency or over-expansion of a refrigerant occurs. This may lower efficiency of the ejector.

In order to solve such problems, there has been proposed an ejector having a moveable needle capable of controlling a size of a diameter of a neck of a nozzle (a sectional area of a discharge side end of the nozzle), by relatively moving the needle with respect to the nozzle. However, the ejector having such a moveable needle, and a refrigeration cycle apparatus having the same may have the following problems. That is, only a diameter of a neck of the nozzle, a factor influencing efficiency of the ejector, may be controlled. Further, it is difficult to control a diameter of an expansion portion of the nozzle. Even if the diameter of the expansion portion is controlled, it is dependent on a control of a diameter of the nozzle neck. This may cause the control not to correspond to various driving conditions, that is, this may cause difficulty in micro-controlling a flow amount.

BRIEF DESCRIPTION OF THE DRAWINGS

Embodiments will be described in detail with reference to the following drawings in which like reference numerals refer to like elements, and wherein.

DETAILED DESCRIPTION

Figure 1:
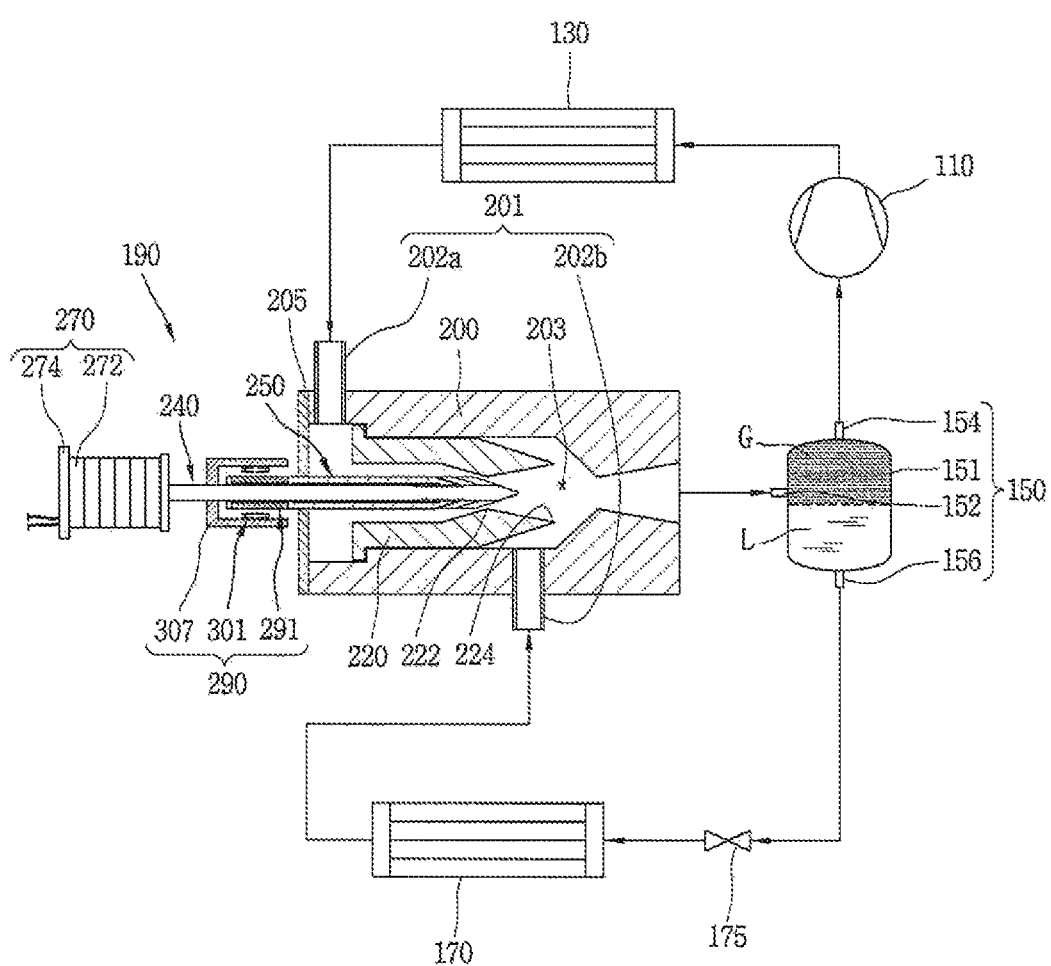
FIG. 1 is a schematic diagram of a refrigeration cycle apparatus having an ejector according to an embodiment.

Hereinafter, embodiments will be explained with reference to the accompanying drawings. Where possible, like or similar reference numerals have been used to indicate like or similar elements, and repetitive disclosure has been omitted. In describing the embodiments, detailed description will be omitted when a specific description for publicly known technologies to which the embodiments pertains is judged to obscure the gist.

Figure 2:
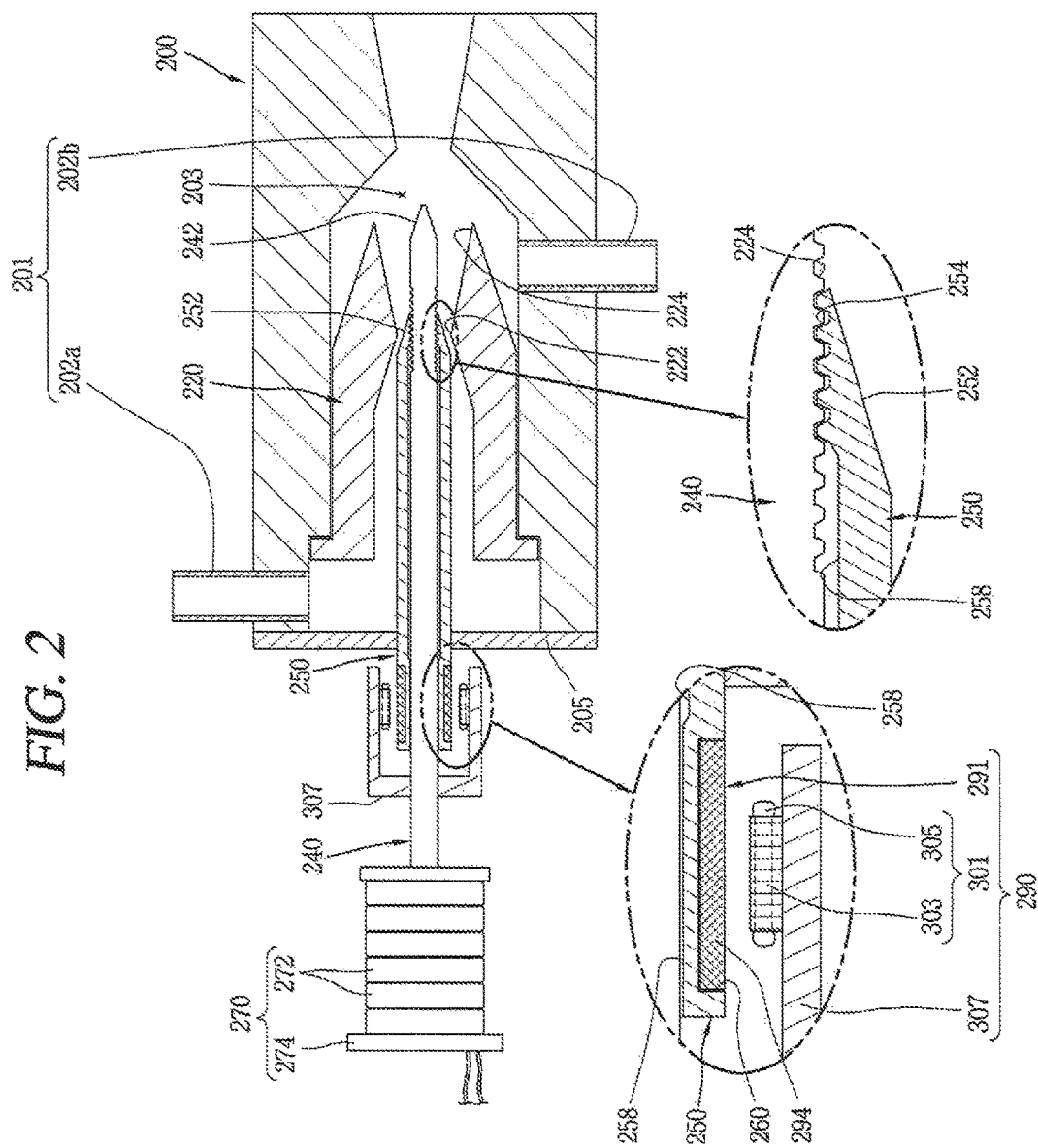
FIG. 2 is an enlarged view of the ejector of FIG. 1.
Figure 3:
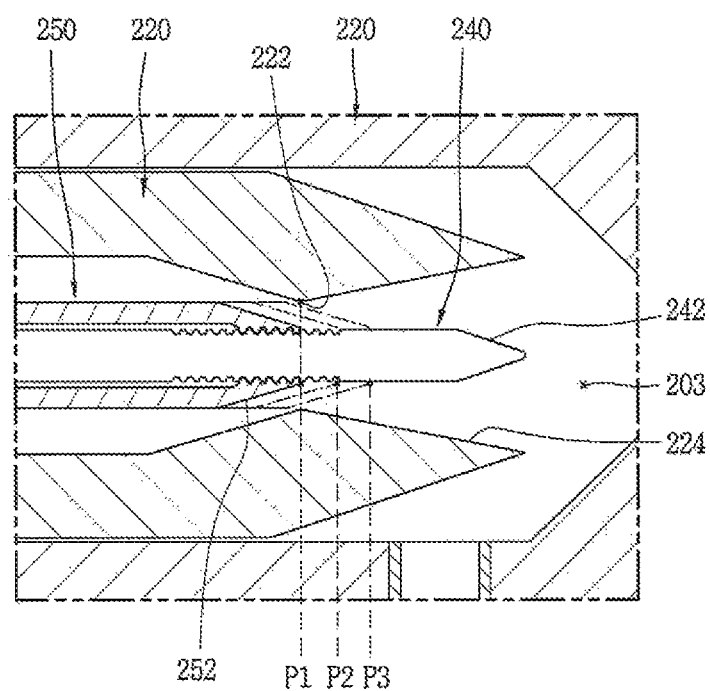
FIG. 3 is an enlarged view of a main portion, which illustrates a position of a second nozzle of the ejector of FIG. 2.
Figure 4:
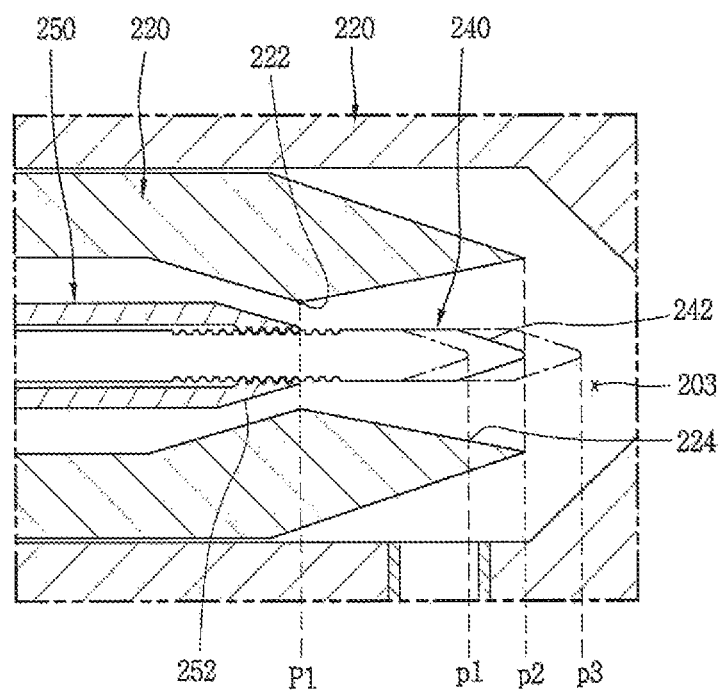
FIG. 4 is an enlarged view of a main portion, which illustrates a position of a first nozzle of the ejector of FIG. 2.

FIG. 1 is a schematic diagram of a refrigeration cycle apparatus having an ejector according to an embodiment. FIG. 2 is an enlarged view of the ejector of FIG. 1.

As shown in FIGS. 1 and 2, a refrigeration cycle apparatus having an ejector according to an embodiment may include a compressor 110 configured to compress a refrigerant; a high pressure side heat exchanger 130 connected to the compressor 110, and configured to cool the compressed refrigerant; a gas-liquid separator 150 connected to the compressor 110, and configured to separate the refrigerant therein into a gas phase and a liquid phase; an evaporator 170 connected to the gas-liquid separator 150, and configured to evaporate the refrigerant; and an ejector 190 having one or a first side connected to the high pressure side heat exchanger 130 and having another or a second side connected to the evaporator 170. The compressor 110 may suction in and compress a low temperature-low pressure gas refrigerant, and may discharge a high temperature-high pressure refrigerant.

The gas-liquid separator 150 may be connected to a suction side of the compressor 110. For example, the gas-liquid separator 150 may include a hermetic container 151, an inlet 152 formed at one side of the hermetic container 151, and a first outlet 154 and a second outlet 156 formed at another side of the hermetic container 151.

In the hermetic container 151, a refrigerant may be divided into a gas refrigerant and a liquid refrigerant according to a specific gravity. The first outlet 154 may be formed such that the gas refrigerant inside of the hermetic container 151 may be discharged therethrough. The second outlet 156 may be formed such that the liquid refrigerant inside of the hermetic container 151 may be discharged therethrough.

The Inlet 152 may be connected to the ejector 190. The refrigerant of two phases in which gas and liquid are mixed with each other, discharged ejector 190, may be introduced into the hermetic container 151.

The first outlet 154 may be connected to the compressor 110. The gas refrigerant separated inside of the hermetic container 151 may be suctioned into the compressor 110.

The second outlet 156 may be connected to the evaporator 170. A throttle valve 175 may be provided at a suction side of the evaporator 170. The liquid refrigerant from the hermetic container 151 of the gas-liquid separator 150 may be depressurized and expanded after passing through the throttle valve 175. The refrigerant depressurized and expanded after passing through the throttle valve 175 may be evaporated at the evaporator 170 by absorbing latent heat.

The high pressure side heat exchanger 130 may be connected to a discharge side of the compressor 110.

The ejector 190 may include an ejector body 200 having an accommodation space therein, a suction part or portion 201, through which a high pressure refrigerant and a low pressure refrigerant may be suctioned into the accommodation space, and a mixing part or portion 203 configured to mix the high pressure refrigerant with the low pressure refrigerant; a nozzle 220 provided in the ejector body 200, having a nozzle neck 222 and an expansion portion 224, and configured to inject the high pressure refrigerant; a first needle 240 moveably provided at the expansion portion 224, and configured to control a flow sectional area of the expansion portion 224; a second needle 250 moveably provided at the nozzle neck 222, and configured to control a flow sectional area of the nozzle neck 222; a first needle driving unit or drive 270 configured to drive the first needle 240; and a second needle driving unit or drive 290 configured to drive the second needle 250. The ejector body 200 may be formed as a hollow body having therein the accommodation space. A high pressure refrigerant suction region 202a, into which a high pressure refrigerant having passed through the high pressure side heat exchanger 130 (hereinafter, referred to as 'high pressure refrigerant') may be suctioned, may be formed at one side of the ejector body 200.

One or a first side of the ejector body 200 may be shielded from the outside. A shielding member 205 configured to shield the ejector body 200 from the outside may be provided at one side of the ejector body 200. Another or a second side of the ejector body 200 may be connected to the gas-liquid separator 150. A low pressure refrigerant suction region 202b, into which a low pressure refrigerant having passed through the evaporator 170 (hereinafter, referred to as 'low pressure refrigerant') may be suctioned, may be formed at another side of the ejector body 200.

The nozzle 220 may be provided in the ejector body 200. The nozzle 220 may be provided with the nozzle neck 222 configured to inject the high pressure refrigerant at a high speed. The nozzle 220 may be provided with the expansion portion 224 configured to expand the refrigerant having passed through the nozzle neck 222.

The first needle 240 may be provided in the expansion portion 224. The first needle 240 may be formed as a rod having a length greater than a diameter thereof. The first needle 240 may include a tapered portion 242 at one end thereof, an outer diameter of which decreases gradually. The first needle 240 may control a flow sectional area of the expansion portion 224 of the nozzle 220 to be increased or decreased, as the tapered portion 242 disposed in the expansion portion 224 is relatively moved with respect to the expansion portion 224 in an axial direction.

The second needle 250 may be provided in the nozzle 220. The second needle 250 may be provided with a tapered portion 252 at one end thereof, an outer diameter of which decreases gradually. The tapered portion 252 of the second needle 250 may be disposed close to the nozzle neck 222 of the nozzle 220. The second needle 250 may control a flow sectional area of the nozzle neck 222 to be increased or decreased, as the tapered portion 252 disposed in the nozzle neck 222 is relatively moved with respect to the nozzle neck 222.

The first needle 240 may be penetratingly-coupled to an inside of the second needle 250. The first and second needles 240, 250 may be coupled to each other in a concentric (coaxial) manner.

In the ejector 190 according to this embodiment, the first and second needles 240, 250 may be disposed at different positions according to a drive condition of a refrigeration cycle, for example, a refrigeration load amount. The drive condition may be classified into a first drive mode ('strong') where a refrigeration load amount is relatively large, a third drive mode ('weak') where a refrigeration load amount is relatively small, and a second drive mode ('middle') where a refrigeration load amount is smaller than that of the first drive mode, but is larger than that of the third drive mode. In this case, the second needle 250 may be moveable to one of a first position corresponding to the first drive mode, a second position corresponding to the second drive mode, and a third position corresponding to the third drive mode. Efficiency of the ejector 190 may be increased when a flow sectional area (diameter) of the nozzle neck 222 of the nozzle 220 is relatively large in the first drive mode (the first position).

When the second needle 250 is disposed at one of the first to third positions, a position of the first needle 240 may be controlled for enhanced efficiency of the cycle, such that a flow sectional area of the expansion portion 224 may be controlled. That is, for example, when the second needle 250 is disposed at one of the first to third positions, the first needle 240 may be moved in the axial direction for enhanced efficiency of the cycle, such that a flow sectional area of the expansion portion 224 may be properly increased or decreased.

For convenience, it is illustrated that the position of the first needle 240 includes the first to third positions. Unlike the second needle 250, an increase of a flow sectional area of the expansion portion 224 does not always mean an increase in efficiency of the cycle.

The first needle drive 270 configured to drive the first needle 240 in the axial direction may be provided at one side of the first needle 240. For example, the first needle drive 270 may be a linear actuator having a piezoelectric device (piezo element) 272.

The piezoelectric device 272 may be formed such that a displacement may be generated in the axial direction, in proportion to a voltage applied thereto. In this embodiment, the piezoelectric device 272 may be configured to generate a displacement by being expanded or contracted in a thickness direction when a voltage is applied thereto.

The first needle drive 270 may include a plurality of piezoelectric devices 272 laminated to each other in a thickness direction. The first needle drive 270 may include a fixing unit or device 274 provided at one side of the piezoelectric devices 272 and configured to fix the plurality of piezoelectric devices 272.

With such a configuration, when a voltage is applied to the plurality of piezoelectric devices 272 of the first needle drive 270, the plurality of piezoelectric devices 272 may be fixed and supported by the fixing unit 274. Accordingly, as the first needle 240 connected to the plurality of piezoelectric devices 272 is relatively moved with respect to the nozzle 220, a flow sectional area (diameter) of the expansion portion 224 may be controlled.

The second needle drive 290 configured to drive the second needle 250 may be provided at one side of the second needle 250. The second needle drive 290 may be an electric motor having a rotor 291 provided at the second needle 250, and having a stator 301 disposed around the rotor 291. The rotor 291 may include a permanent magnet 294 provided around the second needle 250. A permanent magnet coupling portion 260, concaved from an external surface of the second needle 250 so as to couple the permanent magnet 294 thereto, may be provided near the second needle 250.

The permanent magnet 294 may have a cylindrical shape. The permanent magnet 294 may be provided at an outer surface of the second needle 250 for coupling.

In this embodiment, the permanent magnet 294 is formed to have a cylindrical shape. However, this is merely exemplary and embodiments are not limited thereto. That is, the permanent magnet 294 may be provided with a plurality of arc-shaped segment magnets (not shown), for example.

The stator 301 may be provided around the rotor 291. The stator 301 may include a stator core 303, and a stator coil 305 wound on the stator core 303.

The permanent magnet 294 may have a length greater than a length in the axial direction of the stator 301. With such a configuration, even when the second needle 250 is relatively moved with respect to the first needle 240 in the axial direction when the permanent magnet 294 is rotated, a magnetic force may be smoothly generated between the permanent magnet 294 and the stator 301. The length in the axial direction of the permanent magnet 294 may be determined as a length long enough to generate a magnetic force to interact with the stator 301, considering a relatively moveable distance of the second needle 250 with respect to the nozzle neck 222.

A stator supporting portion 307 configured to support the stator 301 may be provided at one side of the stator 301. For example, one or a first side of the stator supporting portion 307 may be coupled to the stator core 303, and another or a second side thereof may be coupled to the first needle 240.

In this embodiment, the stator supporting portion 307 is integrally fixed to an outer surface of the first needle 240. However, this is merely exemplary and embodiments are not limited thereto. That is, the stator supporting portion 307 may be fixed to the ejector body 200.

Figure 5:
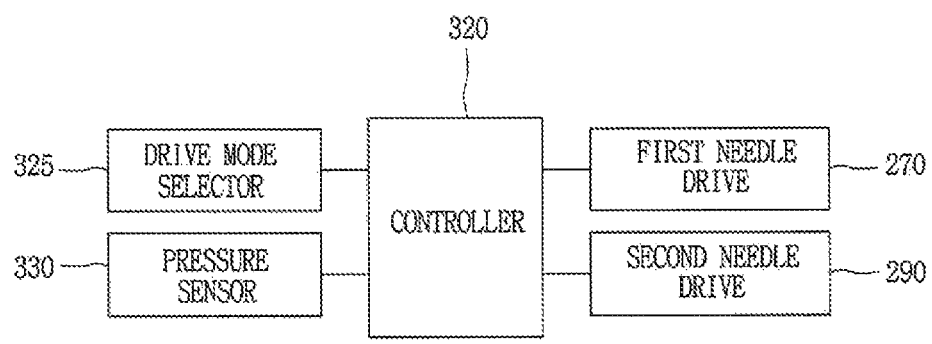
FIG. 5 is a control block diagram of the refrigeration cycle apparatus shown in FIG. 1.

As shown in FIG. 5, the refrigeration cycle apparatus having the ejector according to this embodiment may be provided with a controller 320 configured to control a position of each of the first and second needles 240, 250 according to a drive condition. A drive mode selection unit or selector 325 configured to select a drive mode may be connected to the controller 320 in a communicable manner.

The drive mode may be categorized into a plurality of drive modes according to a compression ratio or a refrigeration load amount. For example, the plurality of drive modes may include a first mode where a compression ratio or a refrigeration load amount is relatively large, a third mode where a compression ratio or a refrigeration load amount is smaller than that of the first mode, and a second mode where a compression ratio or a refrigeration load amount is intermediate between that of the first mode and that of the third mode.

For example, the controller 320 may control the second needle drive 290 such that the second needle 250 may be moveable to one of the first to third positions, based on a drive mode selected by the drive mode selector 325. For example, the controller 320 may control the first needle drive 270 such that the first needle 240 may be moveable in a direction to enhance a drive efficiency of the cycle.

More specifically, for example, the controller 320 may control the first needle drive 270 such that a refrigerant pressure may be sensed and the sensed refrigerant pressure may reach a preset or predetermined pressure. The preset or predetermined pressure may be preset for maximization efficiency of the system, for example. The refrigerant pressure may be a condensation pressure and/or an evaporation pressure. A pressure sensor 330 configured to sense the refrigerant pressure may be connected to and communicated with the controller 320.

Once a drive mode is selected by the drive mode selector 325, the controller 320 may control the second needle drive 290 such that the second needle 250 may be disposed at a corresponding position according to the selected drive mode. The controller 320 may control the first needle drive 270 such that a refrigerant pressure at a preset or predetermined position may be sensed by the pressure sensor 330 and the sensed refrigerant pressure may reach a preset or predetermined pressure.

Hereinafter, another embodiment will be explained with reference to FIGS. 6 to 8.

Figure 6:
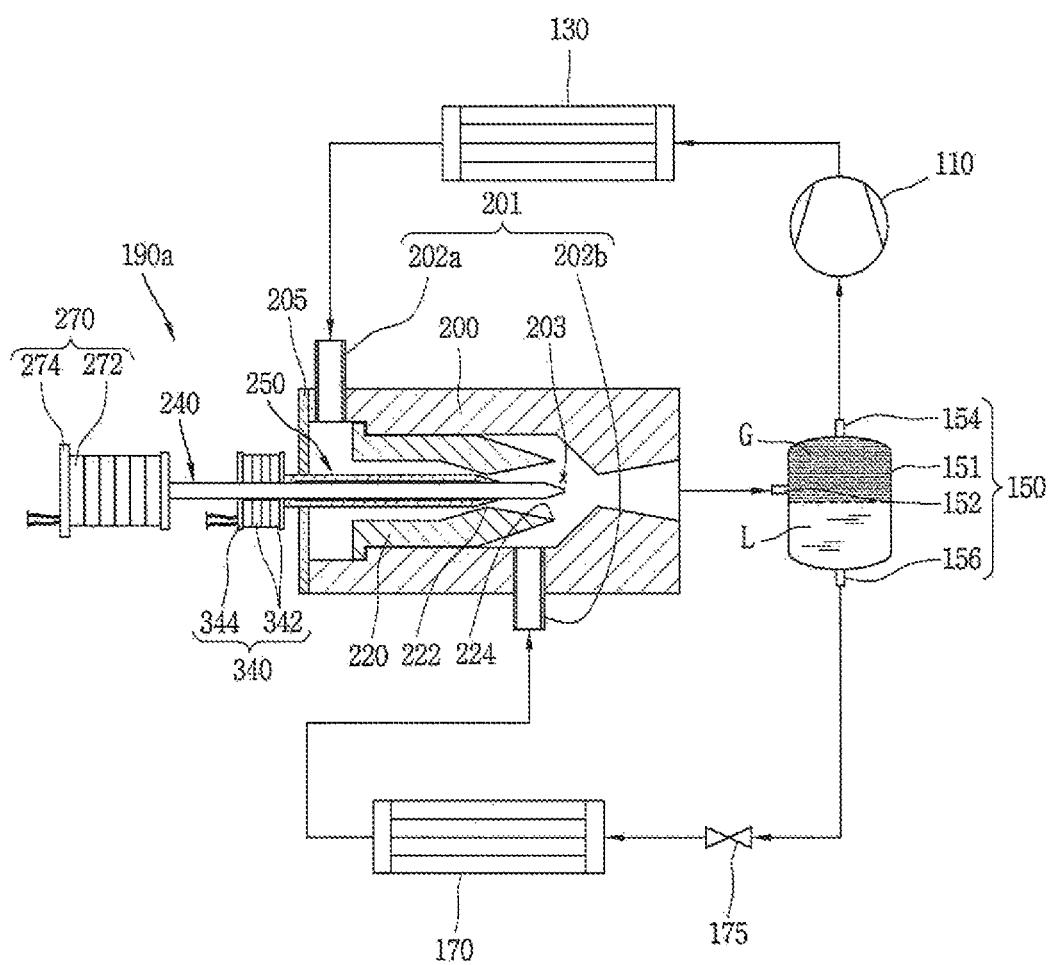
FIG. 6 is a schematic diagram of a refrigeration cycle apparatus having an ejector according to another embodiment.

As shown in FIG. 6, a refrigeration cycle apparatus having an ejector according to another embodiment may include compressor 110 configured to compress a refrigerant; high pressure side heat exchanger 130 connected to the compressor 110, and configured to cool the compressed refrigerant; gas-liquid separator 150 connected to the compressor 110, and configured to separate the refrigerant therein into a gas phase and a liquid phase; evaporator 170 connected to the gas-liquid separator 150, and configured to evaporate the refrigerant; and an ejector 190*a* having one or a first side connected to the high pressure side heat exchanger 130 and having another or a second side connected to the evaporator 170.

Figure 7:
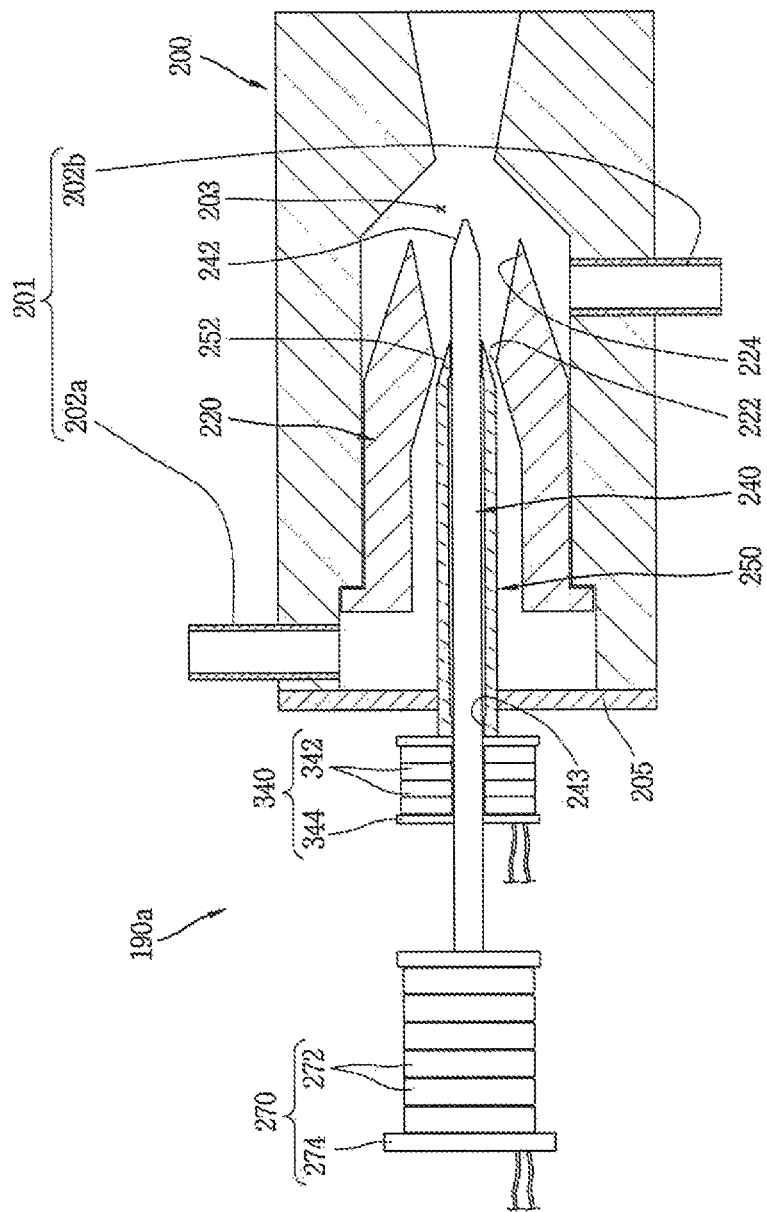
FIG. 7 is an enlarged view of the ejector of FIG. 6.
Figure 8:
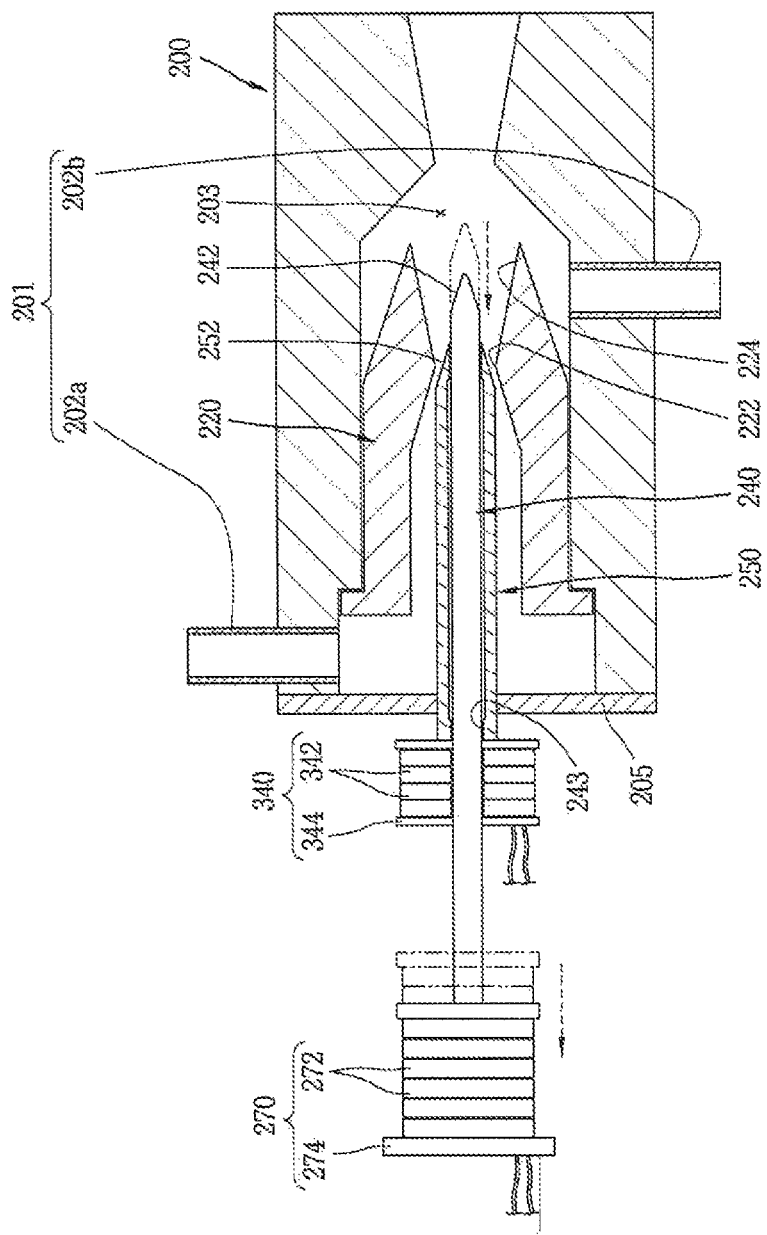
FIG. 8 is a view illustrating each position of first and second nozzles of the ejector of FIG. 7.

As shown in FIG. 7, the ejector 190*a* may include ejector body 200 having an accommodation space therein, suction portion 201 through which a high pressure refrigerant and a low pressure refrigerant may be suctioned into the accommodation space, and mixing portion 203 configured to mix the high pressure refrigerant with the low pressure refrigerant; nozzle 220 provided in the ejector body 200, nozzle neck 222 and expansion portion 224, and configured to inject the high pressure refrigerant; first needle 240 moveably provided at the expansion portion 224, and configured to control the flow sectional area of the expansion portion 224; second needle 250 moveably provided at the nozzle neck 222, and configured to control the flow sectional area of the nozzle neck 222; first needle drive 270 configured to drive the first needle 240; and a second needle driving unit or drive 340 configured to drive the second needle 250.

The first needle 240 may be provided with tapered portion 242 at one end thereof, the outer width of which decreases gradually. The tapered portion 242 of the first needle 240 may be disposed in the expansion portion 224 of the nozzle 220.

The second needle 250 may be provided with tapered portion 252 at one end thereof, the outer width of which decreases gradually. The tapered portion 252 of the second needle 250 may be disposed close to the nozzle neck 222.

The first needle 240 may be penetratingly-coupled to the inside of the second needle 250, so as to be relatively moveable with respect to the second needle 250 in the axial direction.

A first needle accommodation opening 243 configured to accommodate the first needle 240 therein in a relatively-moveable manner may be provided in a middle of the second needle 250. The first needle accommodation opening 243 may be configured to support the first needle 240 so as to be relatively moveable in a concentric manner within the second needle 250.

The first needle drive 270 configured to drive the first needle 240 may be provided outside of the ejector body 200. For example, the first needle drive 270 may be formed as a linear actuator having a plurality of piezoelectric devices 272. The first needle drive 270 may include fixing unit 274 configured to fix the plurality of piezoelectric devices 272.

When a voltage is applied to the plurality of piezoelectric devices 272 of the first needle drive 270, the plurality of piezoelectric devices 272 may be fixed and supported by the fixing unit 274. Accordingly, as the first needle 240 connected to the plurality of piezoelectric devices 272 is relatively moved with respect to the nozzle 220, the flow sectional area (diameter) of the expansion portion 224 may be controlled.

The second needle drive 340 configured to drive the second needle 250 may be provided outside of the ejector body 200. The second needle drive 340 may be provided with a piezoelectric device 342, for example. For example, the second needle drive 340 may be a linear actuator provided with a plurality of piezoelectric devices 342 laminated with each other in a thickness direction. The second needle drive 340 may be provided with a fixing unit or device 344 configured to support the plurality of piezoelectric devices 342.

When a voltage is applied to the plurality of piezoelectric devices 342 of the second needle drive 340, one or a first side of the plurality of piezoelectric devices 342 may be fixed and supported by the fixing unit 344. Accordingly, as the second needle 250 connected to another or a second side of the plurality of piezoelectric devices 342 is relatively moved with respect to the nozzle neck 222 of the nozzle 220, a flow sectional area (diameter) of the nozzle neck 222 may be controlled.

At a time of controlling the flow sectional area of the nozzle neck 222, the controller 320 may control a proper voltage to be applied to the plurality of piezoelectric devices 342 of the second needle drive 340. Accordingly, as the plurality of piezoelectric devices 342 of the second needle drive 340 are expanded or contracted, the tapered portion 252 of the second needle 250 may be relatively moved with respect to the nozzle neck 222. As a result, the flow sectional area of the nozzle neck 222 may be properly controlled.

At a time of controlling the flow sectional area of the expansion portion 224 of the nozzle 220, the controller 320 may control a proper voltage to be applied to the plurality of piezoelectric devices 272 of the first needle drive 270. As the plurality of piezoelectric devices 272 of the first needle drive 270 are properly expanded or contracted by a voltage applied thereto, the tapered portion 242 of the first needle 240 may be relatively moved with respect to the expansion portion 224 of the nozzle 220. As a result, the flow sectional area of the expansion portion 224 of the nozzle 220 may be properly controlled.

Hereinafter, another embodiment will be explained with reference to FIGS. 9 to 11.

Figure 9:
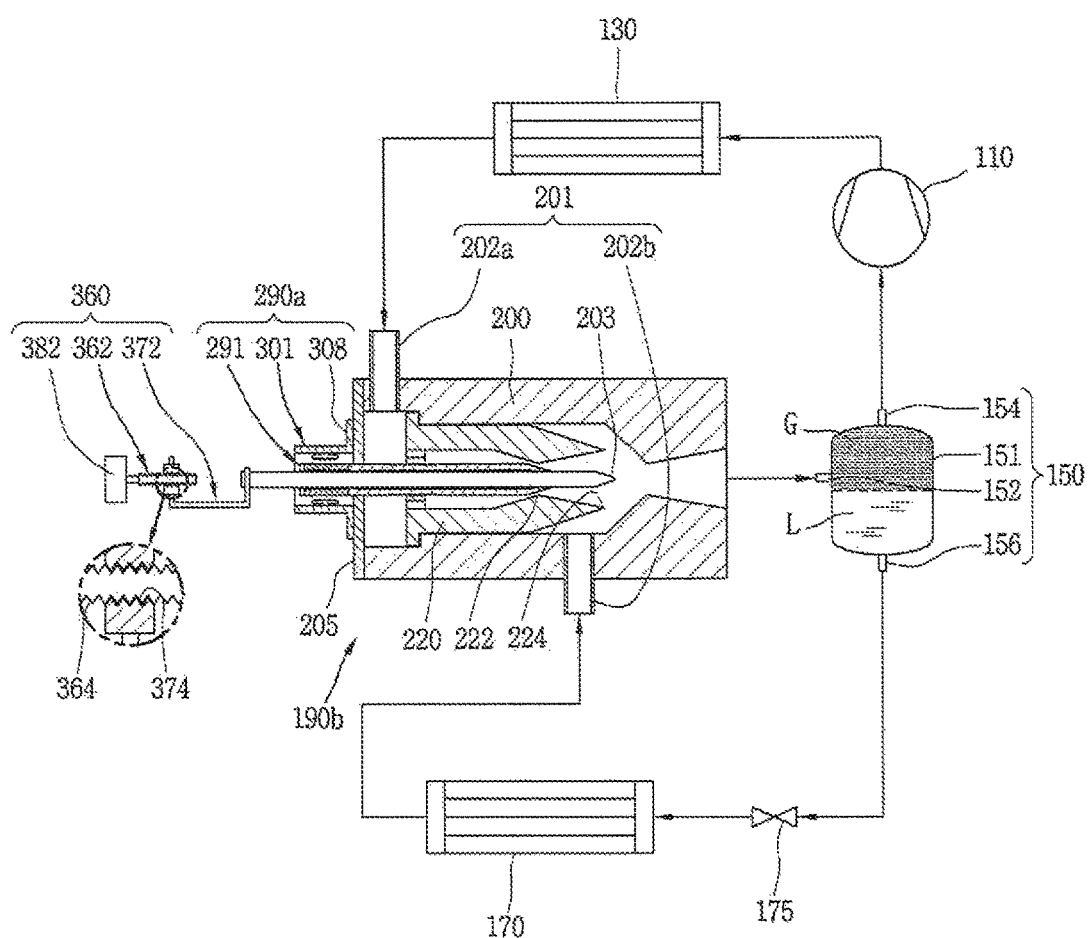
FIG. 9 is a schematic diagram of a refrigeration cycle apparatus having an ejector according to another embodiment.
Figure 10:
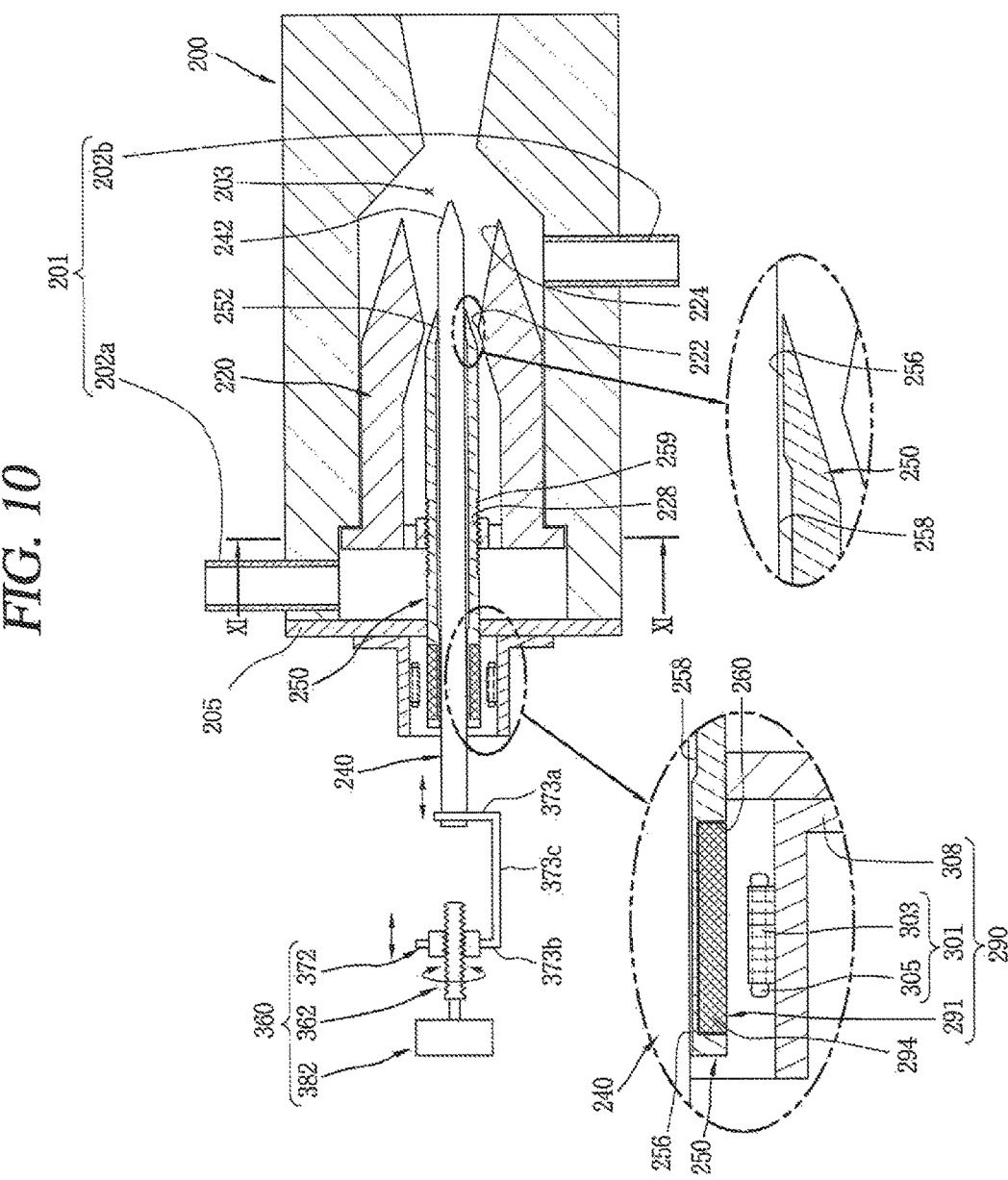
FIG. 10 is an enlarged view of the ejector of FIG. 9.
Figure 11:
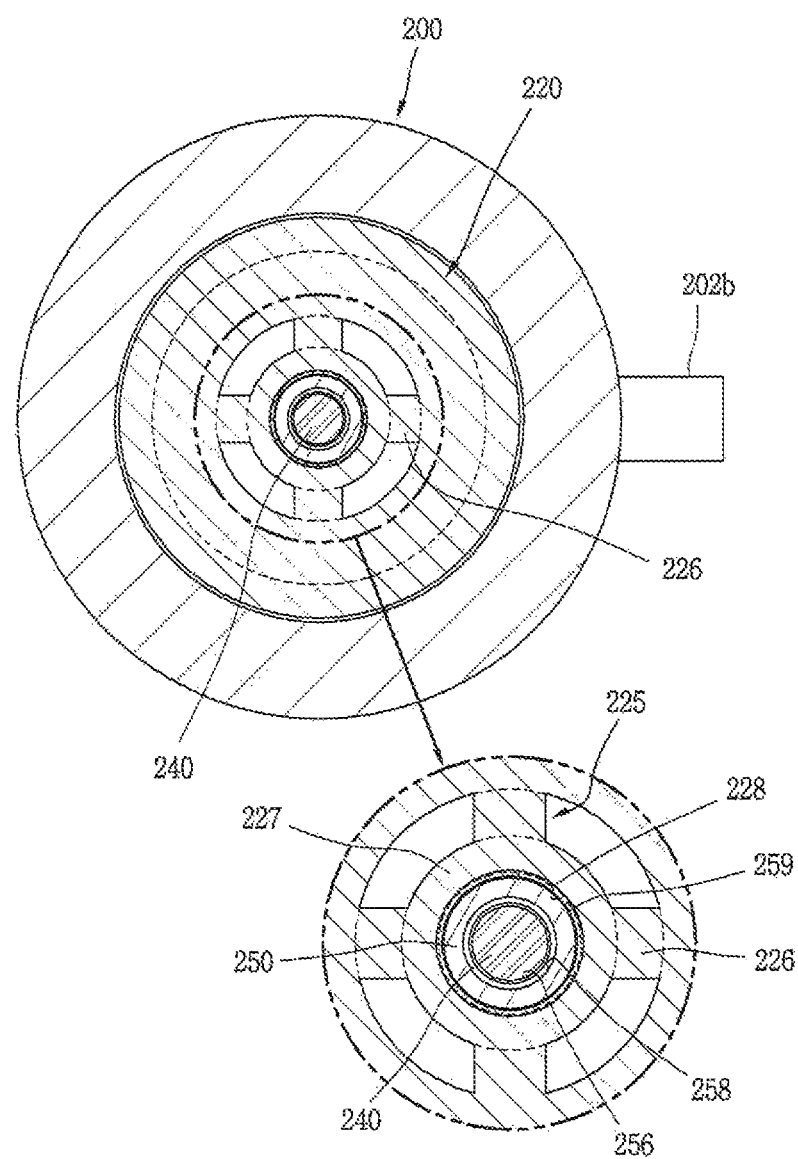
FIG. 11 is a sectional view taken along line 'XI-XI' in FIG. 10.

As shown in FIGS. 9 and 10, a refrigeration cycle apparatus having an ejector according to another embodiment may include compressor 110 configured to compress a refrigerant; high pressure side heat exchanger 130 connected to the compressor 110, and configured to cool the compressed refrigerant; gas-liquid separator 150 connected to the compressor 110, and configured to separate the refrigerant therein into a gas phase and a liquid phase; evaporator 170 connected to the gas-liquid separator 150, and configured to evaporate the refrigerant; and an ejector 190b having one or a first side connected to the high pressure side heat exchanger 130 and having another or a second side connected to the evaporator 170.

The ejector 190b may include ejector body 200 having an accommodation space therein, suction portion 201 through which a high pressure refrigerant and a low pressure refrigerant may be suctioned into the accommodation space, and mixing portion 203 configured to mix the high pressure refrigerant with the low pressure refrigerant; nozzle 220 provided in the ejector body 200, having nozzle neck 222 and expansion portion 224, and configured to inject the high pressure refrigerant; first needle 240 moveably provided at the expansion portion 224, and configured to control a flow sectional area of the expansion portion 224; second needle 250 moveably provided at the nozzle neck 222, and configured to control the flow sectional area of the nozzle neck 222; a first needle driving unit or drive 360 configured to drive the first needle 240; and a second needle driving unit or drive 290a configured to drive the second needle 250. The first needle drive 360 configured to drive the first needle 240 may be provided outside of the ejector body 200.

The first needle drive 360 may include a lead screw 362 disposed to be spaced from the first needle 240; a connection member 372 configured to connect the lead screw 362 and the first needle 240 with each other; and a lead screw drive portion or drive 382 configured to drive the lead screw 362. One or a first end of the connection member 372 may be connected to the first needle 240 so as to be relatively moveable, and a female screw portion 374 screw-coupled to the lead screw 362 may be provided at another or a second end of the connection member 372. The connection member 372 may be formed to have a 'U' shape. The connection member 372 may include a first connection part or portion 373a connected to the first needle 240, a second connection part or portion 373b connected to the lead screw 362, and a third connection part or portion 373c configured to connect the first and second connection portions 373a, 373b with each other.

The first connection portion 373a may be connected to the first needle 240 such that the first needle 240 may rotate in a relative manner. The second connection portion 373b may be connected to the lead screw 362 in a state in which the female screw portion 374 is interposed therebetween.

The lead screw drive 382 may be an electric motor configured to generate a drive force when power is applied thereto. The lead screw drive (electric motor) 382 may be configured to perform a normal rotation and a counter rotation.

As the first needle 240 is relatively moved with respect to the nozzle 220, a flow sectional area of the expansion portion 224 may be controlled. The first needle 240 may be penetratingly-coupled to the second needle 250. The second needle 250 may be coupled to an external surface of the first needle 240 in a relatively-moveable manner and in a slidable manner.

Supporting units or supports 256, which may plane-contact an outer surface of the first needle 240, may be provided on an inner surface of the second needle 250. The supports 256 may be spaced from each other in the axial direction.

A cut-out portion or cut-out 258, cut-out in a radial direction so as to be spaced from an outer surface of the first needle 240, may be formed between a female screw portion 228 and the support 256. The second needle 250 may be supported so as to be relatively rotatable with respect to the nozzle 220.

A second needle supporting unit or support 225 configured to support the second needle 250 so as to be relatively-rotatable may be provided on an inner surface of the nozzle 220. For example, the second needle support 225 may include a plurality of rods 226 spaced from each other in a circumferential direction of the nozzle 220, and a cylindrical part or portion 227 provided at a central region of the rods 226. The second needle 250 may be screw-coupled to the second needle support 225.

A male screw portion 259 may be provided on an outer surface of the second needle 250. The female screw portion 228 screw-coupled to the male screw portion 259 may be provided at the second needle support 225. The female screw portion 228 may be provided at the cylindrical portion 227 of the second needle support 225.

The second needle drive 290a configured to drive the second needle 250 may be provided outside of the ejector body 200. The second needle drive 290a may include a rotor 291 provided at the second needle 250, and a stator 301 provided around the rotor 291.

The second needle drive 290a may be provided with a stator supporting portion or support 308 configured to support the stator 301. One or a first side of the stator support 308 may be coupled to an outer surface of the stator core 303. The stator support 308 may be forcibly-coupled to the stator core 303, for example. Another or a second side of the stator support 308 may be coupled to the ejector body 200. The stator support 308 may be coupled to shielding member 205 of the ejector body 200.

Permanent magnet 294 may have a length greater than a length of the stator 301 in the axial direction.

At a time of controlling the flow sectional area of the nozzle neck 222, the controller 320 may control the second needle drive 290a such that the second needle 250 may perform a normal rotation or a counter rotation with respect to the nozzle 220. Once the second needle 250 is rotated in one direction, the male screw portion 259 of the second needle 250 may be relatively moved with respect to the female screw portion 228 of the second needle support 225, thereby moving in the axial direction. The tapered portion 252 of the second nozzle 250 may approach or move away from the nozzle neck 222, and the flow sectional area (diameter) of the nozzle neck 222 may be controlled.

At a time of controlling the flow sectional area of the expansion portion 224 of the nozzle 220, the controller 320 may control the lead screw drive 382 of the first needle drive 360 to perform a normal rotation or a counter rotation. Once the lead screw 362 is rotated in one direction, the female screw portion 374 screw-coupled to the lead screw 362 may be relatively moved in the axial direction. Accordingly, as the first needle 240 connected to the expansion portion 224 of the nozzle 220 by the connection member 372 is relatively moved with respect to the expansion portion 224 of the nozzle 220, the flow sectional area of the expansion portion 224 may be controlled.

As discussed above, in the embodiments as disclosed herein, as the flow sectional area of the nozzle neck and the flow sectional area of the expansion portion of the nozzle are independently controlled, a flow amount may be micro-controlled in correspondence to various drive conditions of the cycle, through various combinations of a diameter of the nozzle neck and a diameter of the expansion portion. This may enhance a drive efficiency of the cycle.

Further, as the first needle drive or the second needle drive is provided with piezoelectric devices, responsiveness may be enhanced. Furthermore, as the first needle drive or the second needle drive is provided with an electric motor, fabrication costs may be reduced.

Therefore, embodiments disclosed herein provide an ejector capable of independently controlling a flow sectional area of a nozzle neck and a flow sectional area of an expansion portion, and a refrigeration cycle apparatus having an ejector. Embodiments disclosed herein further provide an ejector capable of micro-controlling a flow amount through various combinations of a flow sectional area of a nozzle neck and a flow sectional area of an expansion portion of a nozzle, and a refrigeration cycle apparatus having an ejector.

Embodiments disclosed herein provide an ejector that may include an ejector body having an accommodation space therein, having a suction part or portion through which a high pressure refrigerant and a low pressure refrigerant may be suctioned into the accommodation space, and having a mixing part or portion configured to mix the high pressure refrigerant with the low pressure refrigerant; a nozzle provided in the ejector body, having a nozzle neck and an expansion portion, and configured to inject the high pressure refrigerant; a first needle moveably provided at the expansion portion, and configured to control a flow sectional area of the expansion portion; a second needle moveably provided at the nozzle neck, and configured to control a flow sectional area of the nozzle neck; a first needle driving unit or drive configured to drive the first needle; and a second needle driving unit or drive configured to drive the second needle. The first needle may be provided with a tapered portion having its outer width decreased gradually. The tapered portion of the first needle may be disposed in the expansion portion of the nozzle.

The second needle may be provided with a tapered portion having its outer width decreased gradually. The tapered portion of the second needle may be disposed close to the nozzle neck of the nozzle.

The first needle may be penetratingly-coupled to the second needle so as to be relatively moveable. The first needle may be penetratingly-coupled to the second needle by screws.

The first needle driving unit may be provided with piezo-electric devices. The piezoelectric devices may move the first needle in a shaft or axial direction, by being expanded and contracted when a voltage is applied thereto. A fixing unit configured to fix and support the piezoelectric devices may be formed at one side of the piezoelectric devices.

The second needle driving unit may be formed as an electric motor having a rotor provided at the second needle, and having a stator provided around the rotor. The rotor may be provided with a permanent magnet inserted into a surface of the second needle. The permanent magnet may have a cylindrical shape, or may be provided with a plurality of arc-shaped segment magnets.

A male screw portion may be formed on an outer surface of the first needle, and a female screw portion may be formed on an inner surface of the second needle. A supporting unit or support, rotatable and slidable on an outer surface of the first needle, may be formed at one side of the female screw portion. The female screw portion and the supporting unit may be spaced from each other. A cut-out portion or cut-out, cut-out so as to be spaced from a surface of the first needle, may be formed between the female screw portion and the supporting unit.

The second needle driving unit may be provided with piezoelectric devices. The piezoelectric devices may move the second needle in a shaft or axial direction, by being expanded and contracted when a voltage is applied thereto. A fixing unit configured to fix and support the piezoelectric devices may be formed at one side of the piezoelectric devices.

The first needle driving unit may include a lead screw disposed to be spaced from the first needle; a connection member configured to connect the lead screw and the first needle with each other; and a lead screw driving portion configured to drive the lead screw. One or a first end of the connection member may be connected to the first needle so as to be relatively moveable, and a female screw portion screw-coupled to the lead screw may be provided at another or a second end of the connection member. The lead screw driving portion may be provided with an electric motor.

Embodiments disclosed herein further provide a refrigeration cycle apparatus having an ejector that may include a compressor configured to compress a refrigerant; a high pressure side heat exchanger connected to the compressor, and configured to cool a high pressure refrigerant; a gas-liquid separator connected to the compressor, and configured to separate a refrigerant which exists therein into a gas phase and a liquid phase; an evaporator connected to the gas-liquid separator, and configured to evaporate a refrigerant; and the ejector having one or a first side connected to the high pressure side heat exchanger, and having another or a second side connected to the evaporator. The refrigeration cycle apparatus having an ejector may further include a throttle valve provided between the evaporator and the gas-liquid separator, and configured to control a flow sectional area of a flow path which connects the evaporator with the gas-liquid separator.

The refrigeration cycle apparatus having an ejector may further include a drive mode selection unit or selector configured to select one of a plurality of drive modes, and a controller configured to control first and second needle drive units or drives, based on a drive mode selected by the driving mode selection unit.

Further scope of applicability of the present application will become more apparent from the detailed description given hereinafter. However, it should be understood that the detailed description and specific examples, while indicating embodiments, are given by way of illustration only, since various changes and modifications within the spirit and scope will become apparent to those skilled in the art from the detailed description.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ejector, comprising:
an ejector body having an accommodation space therein, a suction portion through which a high pressure refrigerant and a low pressure refrigerant are suctioned into the accommodation space, and a mixing portion configured to mix the high pressure refrigerant with the low pressure refrigerant;
a nozzle provided in the ejector body, having a nozzle neck and an expansion portion, and configured to inject the high pressure refrigerant into the mixing portion; and
first and second needles moveably provided at the expansion portion and the nozzle neck, respectively, and configured to control a flow sectional area of the expansion portion and the nozzle neck, respectively, wherein the first and second needles are coaxial, wherein the first needle is penetratingly-coupled to the second needle so as to be relatively moveable with respect to the second needle.

2. The ejector of claim 1, further including a needle drive configured to drive the first and second needles.

3. The ejector of claim 2, wherein the needle drive includes:
a linear actuator configured to drive the first needle; and
an electric motor configured to drive the second needle.

4. A refrigeration cycle apparatus having an ejector, comprising:
a compressor configured to compress a refrigerant;
a high pressure side heat exchanger connected to the compressor, and configured to cool the compressed refrigerant;
a gas-liquid separator connected to the compressor, and configured to separate the refrigerant therein into a gas phase and a liquid phase;
an evaporator connected to the gas-liquid separator, and configured to evaporate the refrigerant; and
the ejector of claim 1, the ejector having a first side connected to the high pressure side heat exchanger and having a second side connected to the evaporator.

5. An ejector, comprising:
an ejector body having an accommodation space therein, a suction portion through which a high pressure refrigerant and a low pressure refrigerant are suctioned into the accommodation space, and a mixing portion configured to mix the high pressure refrigerant with the low pressure refrigerant;
a nozzle provided in the ejector body, having a nozzle neck and an expansion portion, and configured to inject the high pressure refrigerant into the mixing portion;
a first needle moveably provided at the expansion portion, and configured to control a flow sectional area of the expansion portion;
a second needle moveably provided at the nozzle neck, and configured to control a flow sectional area of the nozzle neck;
a linear actuator configured to drive the first needle; and
an electric motor configured to drive the second needle, wherein the first needle is penetratingly-coupled to the second needle so as to be relatively moveable with respect to the second needle.

6. The ejector of claim 5, wherein each of the first and second needles is provided with a tapered portion, an outer width of which decreases gradually.

7. The ejector of claim 5, wherein the electric motor includes piezoelectric devices.

8. The ejector of claim 5, wherein the linear actuator includes:
a lead screw spaced from the first needle;
a connection member having a first end connected to the lead screw, and a second end connected to the first needle, the connection member being configured to connect the lead screw and the first needle with each other; and
a lead screw drive configured to drive the lead screw.

9. The ejector of claim 8, wherein the second end of the connection member is connected to the first needle so as to be moveable with the first needle, and a female screw portion screw-coupled to the lead screw is provided at the first end of the connection member.

10. The ejector of claim 8, wherein the lead screw drive includes an electric motor.

11. A refrigeration cycle apparatus having an ejector, comprising:
a compressor configured to compress a refrigerant;
a high pressure side heat exchanger connected to the compressor, and configured to cool the compressed refrigerant;
a gas-liquid separator connected to the compressor, and configured to separate the refrigerant therein into a gas phase and a liquid phase;
an evaporator connected to the gas-liquid separator, and configured to evaporate the refrigerant; and
the ejector of claim 5, the ejector having a first side connected to the high pressure side heat exchanger and having a second side connected to the evaporator.

12. The refrigeration cycle apparatus of claim 11, further including a throttle valve provided between the evaporator and the gas-liquid separator, and configured to control a flow sectional area of a flow path that connects the evaporator with the gas-liquid separator.

13. The refrigeration cycle apparatus of claim 11, further including:
a controller configured to control the linear actuator and electric motor; and
a drive mode select module associated with the controller by which a drive mode for positioning at least the second needle is selected,
wherein the controller is configured to control the linear actuator and the electric motor, based on a drive mode selected by the drive mode select module.

14. The ejector of claim 5, wherein the first needle is penetratingly-coupled to the second needle by screws.

15. The ejector of claim 14, wherein the linear actuator includes piezoelectric devices.

16. The ejector of claim 15, wherein the electric motor includes:
a rotor provided at the second needle; and
a stator provided around the rotor.

17. The ejector of claim 16, wherein the rotor is provided with a permanent magnet inserted into a surface of the second needle.

18. The ejector of claim 16, wherein a male screw portion is formed on an outer surface of the first needle, wherein a female screw portion is formed on an inner surface of the second needle, and wherein a support, rotatable and slidable on an outer surface of the first needle, is formed at one side of the female screw portion.

19. The ejector of claim 18, wherein the female screw portion and the support are spaced from each other, and wherein a cut-out, spaced from a surface of the first needle, is formed between the female screw portion and the support.

* * * * *